United States Patent
Mattingly et al.

(10) Patent No.: US 12,291,677 B2
(45) Date of Patent: May 6, 2025

(54) METHODS FOR EXPANDING AND ENRICHING HYDROCARBON DILUENT POOLS

(71) Applicant: Texon Midstream, LLC, Houston, TX (US)

(72) Inventors: Larry D. Mattingly, Sanford, FL (US); Ronnie D. Andrews, Spring, TX (US); John Colin Robbins, Houston, TX (US)

(73) Assignee: Texon Midstream, LLC, Houston, TX (US)

( * ) Notice: Subject to any disclaimer, the term of this patent is extended or adjusted under 35 U.S.C. 154(b) by 521 days.

(21) Appl. No.: 17/871,956

(22) Filed: Jul. 24, 2022

(65) Prior Publication Data

US 2022/0356403 A1    Nov. 10, 2022

Related U.S. Application Data

(63) Continuation-in-part of application No. 16/921,967, filed on Jul. 7, 2020, now Pat. No. 11,421,158, which is a continuation-in-part of application No. 15/447,657, filed on Mar. 2, 2017, now Pat. No. 10,717,935, which is a continuation of application No. 13/873,506, filed on Apr. 30, 2013, now Pat. No. 9,637,685.

(60) Provisional application No. 61/645,094, filed on May 10, 2012.

(51) Int. Cl.
G05D 21/02 (2006.01)
C10C 3/00 (2006.01)
C10G 1/00 (2006.01)

(52) U.S. Cl.
CPC ............... C10C 3/005 (2013.01); C10G 1/00 (2013.01); G05D 21/02 (2013.01); *C10G 2300/802* (2013.01)

(58) Field of Classification Search
CPC .................. G05D 21/02; C10G 2300/308
See application file for complete search history.

(56) References Cited

U.S. PATENT DOCUMENTS

| | | |
|---|---|---|
| 2,246,875 A | 6/1941 | Carney |
| 2,297,185 A | 9/1942 | Hollander et al. |
| 2,937,140 A | 5/1960 | Stinson |
| 3,179,291 A | 4/1965 | Umbach et al. |
| 3,342,199 A | 9/1967 | McEvoy |
| 3,410,293 A | 11/1968 | Emyei |
| 3,484,590 A | 12/1969 | Stanton |
| 3,548,846 A * | 12/1970 | Allen ........................ F17D 1/16 62/50.7 |
| 3,751,644 A | 8/1973 | Mayer |
| 3,813,925 A | 6/1974 | Fenske et al. |
| 3,900,391 A | 8/1975 | Merrill, Jr. |
| 3,904,508 A | 9/1975 | Whyte et al. |
| 3,999,959 A | 12/1976 | Bajek |
| 4,268,701 A | 5/1981 | Dang Vu et al. |
| 4,523,928 A | 6/1985 | Hillman et al. |
| 4,543,819 A | 10/1985 | Chin et al. |
| 4,867,198 A | 9/1989 | Faust |
| 4,876,653 A | 10/1989 | McSpadden et al. |
| 4,882,041 A | 11/1989 | Scott |
| 4,901,559 A | 2/1990 | Grabner |
| 5,004,850 A | 4/1991 | Wilson |
| 5,093,533 A | 3/1992 | Wilson |
| 5,133,391 A | 7/1992 | Johansson et al. |
| 5,163,586 A | 11/1992 | Zinsmeyer |
| 5,193,594 A | 3/1993 | Johansson et al. |
| 5,208,402 A | 5/1993 | Wilson |
| 5,271,526 A | 12/1993 | Williams |
| 5,344,044 A | 9/1994 | Heyden et al. |
| 5,423,607 A | 6/1995 | Jones et al. |
| 5,430,295 A | 7/1995 | Le Febre et al. |
| 5,462,650 A | 10/1995 | Takito et al. |
| 5,542,450 A | 8/1996 | King et al. |
| 5,823,669 A | 10/1998 | Jones |
| 5,860,457 A | 1/1999 | Andersson |
| 5,975,353 A | 11/1999 | Finlayson |
| 5,979,705 A | 11/1999 | Kaehler et al. |
| 6,026,991 A | 2/2000 | Matthews |
| 6,109,286 A | 8/2000 | Johnston |
| 6,161,060 A | 12/2000 | Collins |
| 6,163,738 A | 12/2000 | Miller |
| 6,258,987 B1 | 7/2001 | Schmidt et al. |
| 6,328,772 B1 | 12/2001 | Scott et al. |
| 6,679,302 B1 * | 1/2004 | Mattingly ................. C10L 1/06 141/83 |
| 7,032,629 B1 | 4/2006 | Mattingly et al. |
| 7,631,671 B2 | 12/2009 | Mattingly et al. |
| 8,176,951 B2 | 5/2012 | Mattingly et al. |

(Continued)

FOREIGN PATENT DOCUMENTS

| | | |
|---|---|---|
| CA | 2435113 B2 | 1/2005 |
| WO | 2007124058 B1 | 11/2007 |
| WO | 2014065886 | 5/2014 |

OTHER PUBLICATIONS

EPA Q & A Date Oct. 3, 1904, Abstract.
Grabner Instruments, "About Vapor Pressure Testing," from Grabner Instruments website 2013.
Haskell, N.B. et al. Front-End Volatility of Gasoline Blend Industrial and Engineering Chemistry, vol. 34, No. 2, Feb. 1942, pp. 167-170.
Stewart, W,E. "Predict RVP of Blends Accurately," Petroleum Refiner, vol. 38, No. 6, Jun. 1959, pp. 231-234.
Standard Test Method for Vapor Pressure of Petroleum Products (Reid Method) from Organic website (http://organic.ulsan.ac.kr/reid.html), 2013.
Vazquez-Esparragoza, J. et al."How to Estimate Reid Vapor Pressure (RVP) of Blends," Bryan Research & Engineering, Inc., website, Encyclopedia of Chemical Processing and Design, vol. 47, pp. 415-424; Hydrocarbon Processing, Aug. 1992, pp. 135-138.

(Continued)

*Primary Examiner* — Randy Boyer

(74) *Attorney, Agent, or Firm* — Clark G. Sullivan

(57) ABSTRACT

The invention provides a method for enriching diluents with butane so as not to violate pre-defined limits for liquid hydrocarbon fuels with respect to density, volatility and low density hydrocarbon content.

24 Claims, 4 Drawing Sheets

(56) References Cited

U.S. PATENT DOCUMENTS

| | | | |
|---|---|---|---|
| 8,192,510 | B2 | 6/2012 | Mattingly et al. |
| 8,888,992 | B2 | 11/2014 | Hedrick et al. |
| 2005/0022446 | A1 | 2/2005 | Brundage et al. |
| 2005/0058016 | A1 | 3/2005 | Smith et al. |
| 2006/0278304 | A1 | 12/2006 | Mattingly et al. |
| 2007/0034550 | A1* | 2/2007 | Hedrick ................. C10G 11/00 208/113 |
| 2010/0175313 | A1 | 7/2010 | Mattingly et al. |
| 2012/0216453 | A1 | 8/2012 | Mattingly et al. |

OTHER PUBLICATIONS

Compliance Monitoring for Vapor Pressure or Vapor-Liquid Ratio Tempurature, MiniVap On-line Petrolab Company website, 2013.
Spectro, "Sulfur Monitors and Analyzers for Fuels and Oils," from Spectro website, 2013.
Sindie, "Sindie On-line Analyzer," from Sindie website, 2013.
Environmental Protection Agency, "Gasoline Blending Regulations," 40 G.F.R. § 80.27, 80.41, 80.46, 80.65, 80.195, 80.240.
Reynolds, Robert E ,"The Current Fuel Ethanol Industry Transportation, Marketing, Distribution and Technical Considerations," Downstream Alternatives Inc., May 15, 2000.
Monder, Dayadeep S , Real-Time Optimization of Gasoline Blending with Uncertain Parameters, University of Alberta, Spring 2001.
International Search Report and Written Opinion issued Mar. 5, 2010 in International Patent Application No. PCT/EP10/20207.
International Search Report and Written Opinion, dated May 2, 2014, which issued during the prosecution of International Patent Application No. PCT/US2013/038761, which corresponds to the present application.
International Search Report and Written Opinion, dated Jun. 10, 2014, which issued during the prosecution of International Patent Application No. PCT/US2013/069447 which corresponds to the present application.

* cited by examiner

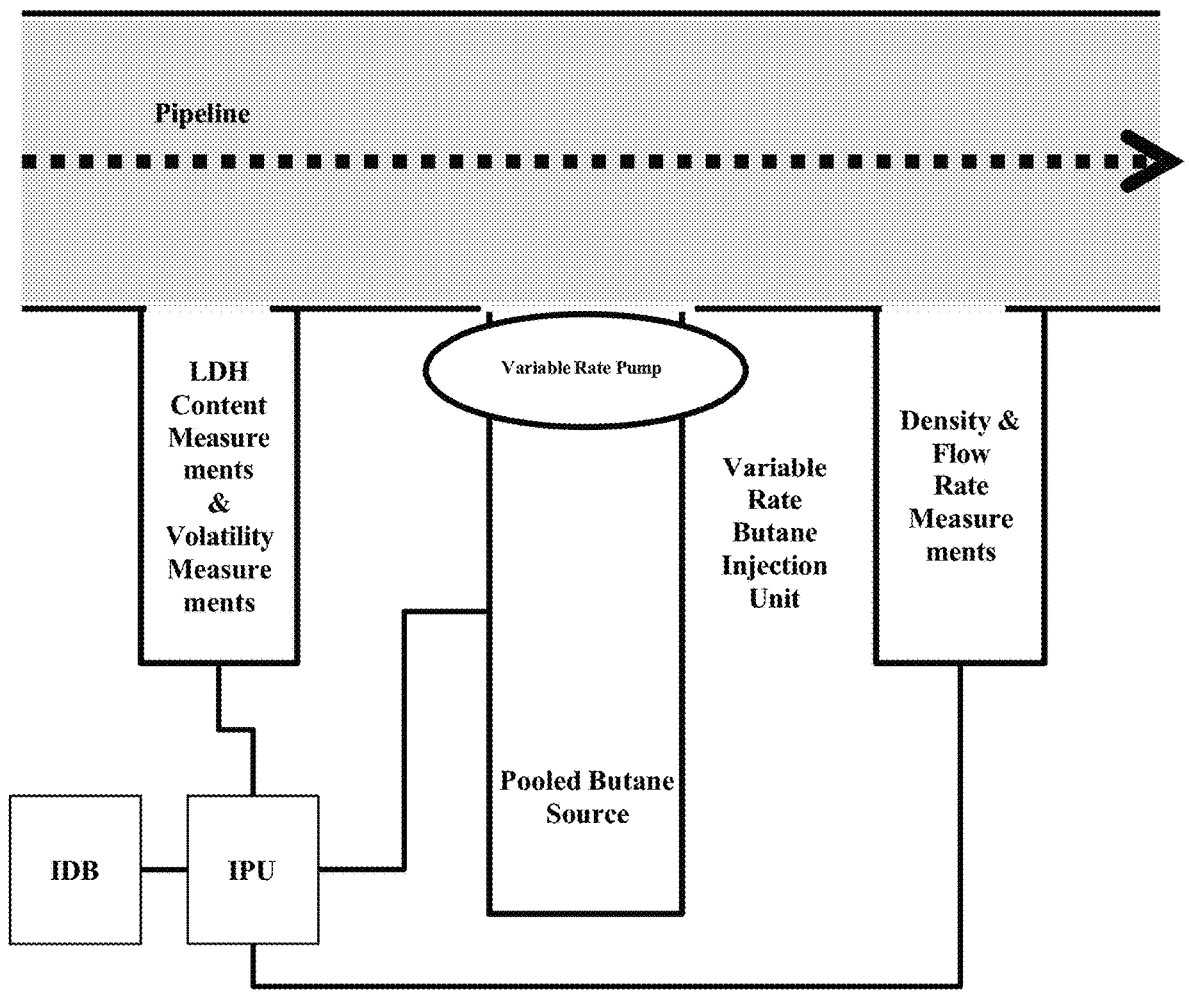
Figure 1: Diagram of an illustrative embodiment showing relationships between controls, data storage, measurement units, butane addition infrastructure and diluent pipeline.

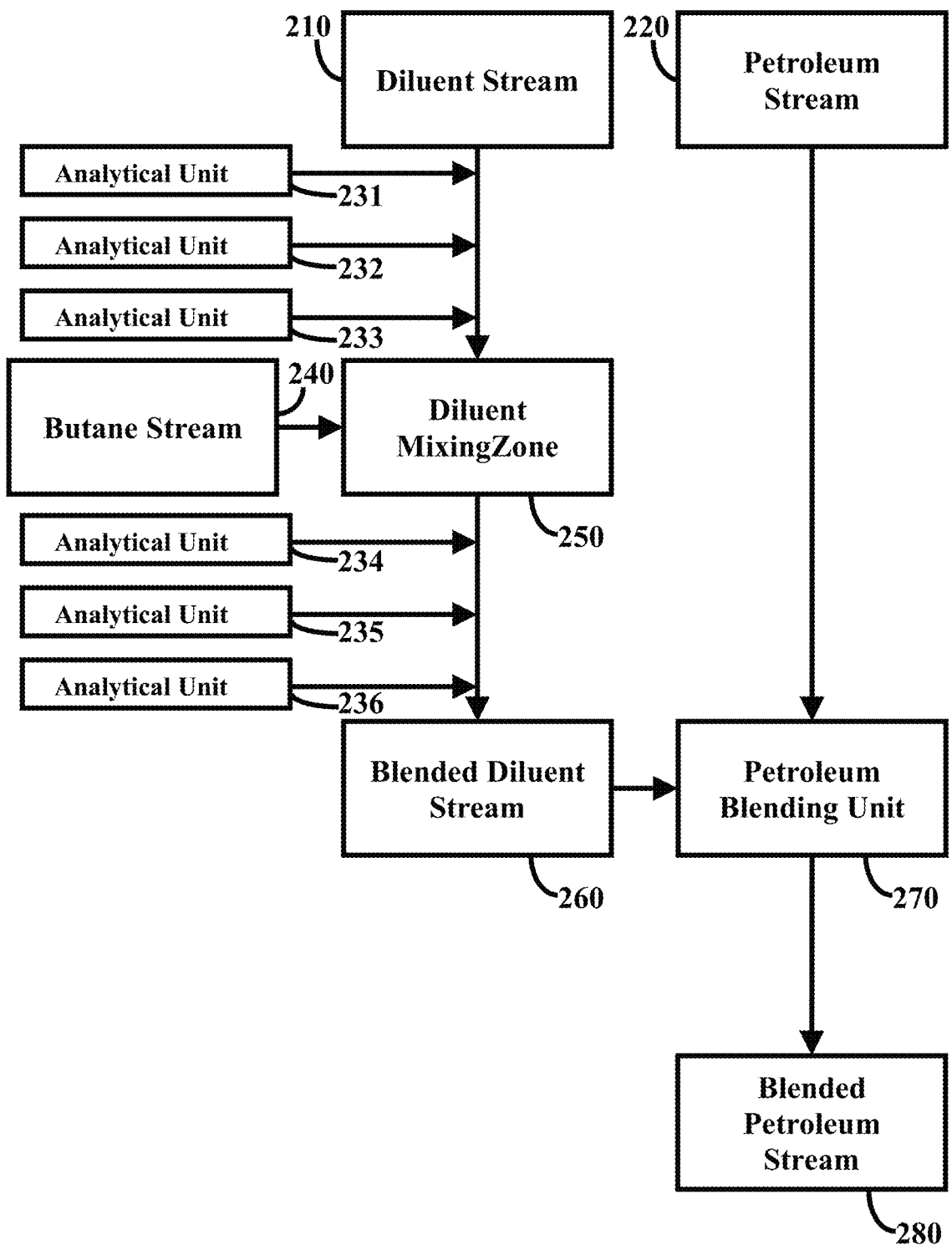
Figure 2: Flow chart for an illustrative embodiment showing relationships between fluid streams, analytical units and confluence modules, including for petroleum.

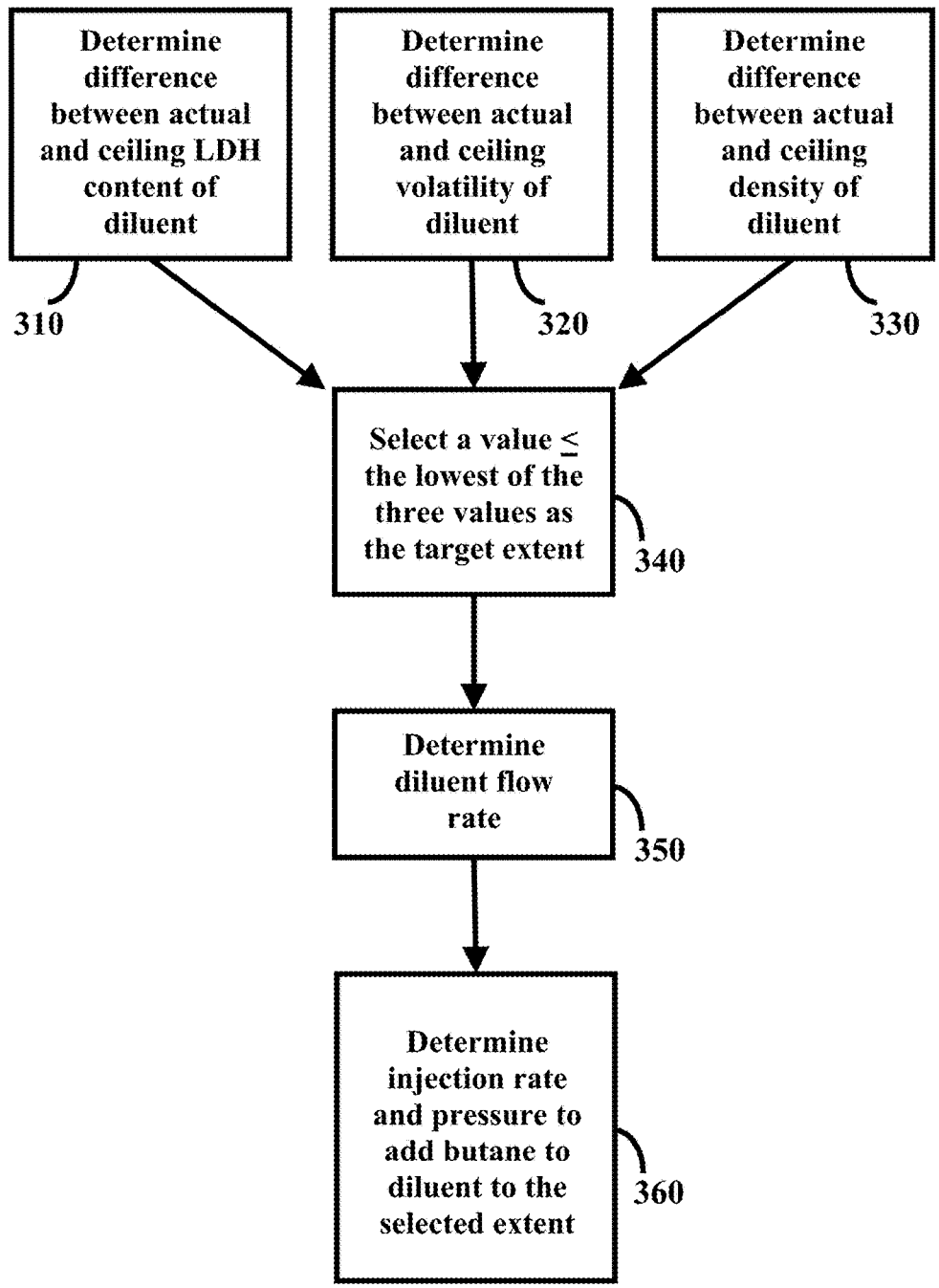
Figure 3: Flow chart for an illustrative embodiment showing relationships between diluent data acquisition, comparison and selection algorithms, and butane injection controls.

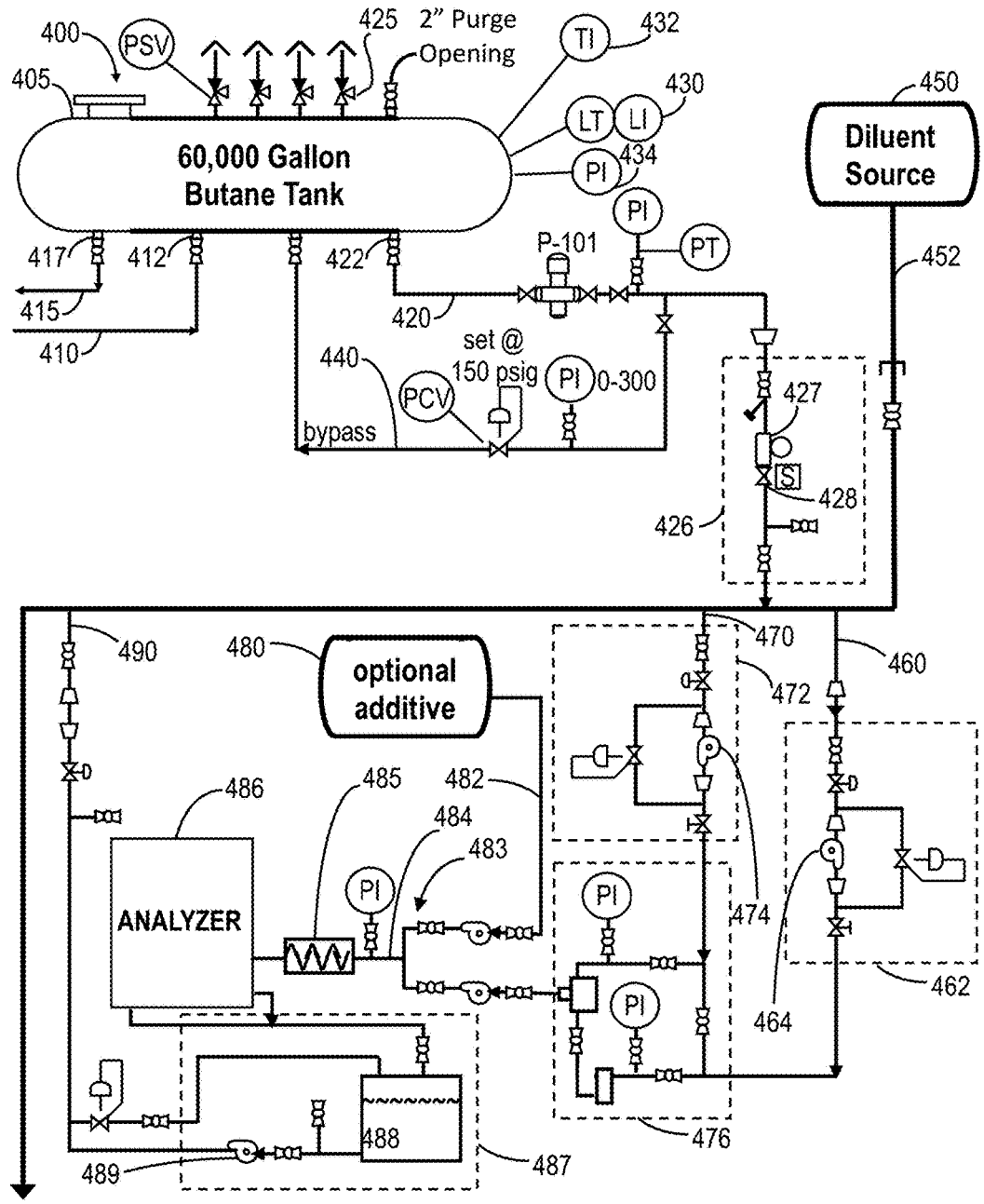
Figure 4: Schematic for an illustrative embodiment showing relationships between its line types, fittings, valves, actuators, instruments and process equipment.

METHODS FOR EXPANDING AND ENRICHING HYDROCARBON DILUENT POOLS

FIELD OF THE INVENTION

The present invention pertains to the use of diluents to reduce the density or viscosity of heavy petroleum streams such as bitumen and heavy crude, and provides methods for improving the availability and controlled enrichment of such diluents.

BACKGROUND OF THE INVENTION

As international demand has far exceeded the annual supply of light crude oil in recent years the petroleum industry has increasingly turned to deposits of more intractable crude petroleum. In addition to being geographically remote and in some cases requiring more advanced technologies for their collection, the petroleum products from these fields are often dense and tar-like. These products are known as heavy crude oil, extra heavy crude oil and bitumen (also called asphalt), being much denser than other petroleum products and exceeding that of water. The substances contain relatively little of the paraffinic substances that impart liquid character to the lighter grades of petroleum products and are tar-like in their properties. The viscosities can approach 100,000 centipoise (i.e., 100 Pa·s) because the compositions are a mixed group of complex, highly polymerized resins and aromatic hydrocarbons.

Because the deposits are generally far from refineries the logistics of bringing the product to market are formidable. Before 1980 most produced bitumen was transported by truck, but in a variety of petroleum-rich areas trucking is seasonally restricted due to constraints imposed by climate. Moreover, trucking is relatively inefficient and expensive compared to pipeline transport. Pipeline transport is plausible, but these products are typically too viscous to be pumped readily and or too dense to flow at normal operating temperatures. Consequently the relatively simple conditions required for production, transportation and refining of lighter grades of crude oils are inadequate for this category of product.

One solution was to make the heavier crude products more liquid by diluting them with liquid or low-melting substances. By satisfying pipeline requirements, these products can be transported efficiently and economically to facilities for further processing into conventionally refined petroleum products. The original diluents for this purpose were natural gas condensates (NGC) or their naturally found naphtha component. But because the supply of those is limited refinery products such as refined naphtha and synthetic crude oil (SCO) are also used as diluents.

The amount of diluent required is substantial. A National Energy Board (Canada) study assumed that a standard "dilbit" (i.e., bitumen diluted with NGC or naphtha) contains 33% NGC, and that a natural synbit (i.e., bitumen diluted with SCO) contains 50% SCO. At the refinery dilbit and synbit are typically treated as heavy or medium crudes, respectively. Bitumen shippers use the diluent choice and blend ratio to lower composition costs, increase blend value, and maintain pipeline transportability. Blend ratios may include 25 to 55% diluent by volume, depending on the bitumen properties, diluent characteristics, pipeline specifications, operating conditions, and refinery requirements. Because the blends contain so much diluent it is commonly recovered by distillation from the diluted petroleum stream at the refinery and then reused for instance to convert additional bitumen to dilbit in the field. The amount of diluent needed was so substantial that by 1985 dual pipelines were in use—the first pipeline transported diluent from its source (whether a refinery or a natural source) to the heavy oil fields, and the second transported diluted crude to a refinery.

The available volume and quality of diluent presents ongoing challenges. Natural gas condensates and native naphtha vary in quantity and quality from site to site in their natural deposits, and even within a source they vary. The use of refined diluents provides more consistency but cannibalizes the inventory for fuels and fine chemicals, imposing a substantial opportunity cost.

Gasoline supplies have been expanded by the addition of butane and other light fraction hydrocarbons. For example, butane is often blended with other gasoline components at the refinery, where it is typically added at the trunk line in response to changes in vapor pressure demand. An exemplary refinery blending process is disclosed in Mayer, U.S. Pat. No. 3,751,644. This patent, which is owned by Sun Oil Company, describes a system for automatically adjusting the amount of butane added to a gasoline stream at a petroleum refinery, based on continuous measurements of the Reid vapor pressure of the gasoline downstream from the point of blending. The described process calculates the amount of butane to be blended based on measurements taken downstream of the blending operation, or calculating the blend ratio based on the Reid vapor pressure upstream from the blending operation.

Bajek's U.S. Pat. No. 3,999,959, which is owned by Universal Oil Products Company, also discloses a system for blending butane and gasoline at a petroleum refinery. The Bajek system blends butane with a low-octane gasoline stream and a high-octane gasoline stream, and then analyzes the blended gasoline to measure characteristics such as Reid vapor pressure and vapor to liquid ration.

Efforts at blending butane at a terminal tank farm have also recently been undertaken. As described in U.S. Pat. No. 6,679,302, butane can be blended in-line with a gasoline stream immediately before the gasoline is dispensed on a tanker truck, and after it has been withdrawn from the storage tank. In a preferred process described in this patent, the Reid vapor pressure is measured upstream of the blending operation, and the blend ratio is calculated based on the upstream measurement.

Several methods have been attempted to improve the precision of butane blending and the predictability of Reid vapor pressure in the final gasoline product. The Grabner unit is a substantial advance in this respect. The Grabner unit (manufactured by Grabner International) is a measuring device capable of providing Reid vapor pressure and vapor to liquid ratio data for a gasoline sample typically within 6-11 minutes of introducing the sample to the unit. It has been employed at some refineries to measure the volatility of gasoline consistently, and to blend butane with the gasoline based upon an allowable Reid vapor pressure for the gasoline.

In spite of these advances, there remains a need for a cost-effective method to expand or augment the available supply of diluents to meet market demand. There is also a need to optimize the physical properties of diluent streams for consistent and cost-effective performance.

SUMMARY OF THE INVENTION

In order to satisfy these needs, the inventors have developed methods to augment diluent streams by blending them in a controlled way with low density hydrocarbons ("LDH") to achieve optimized physical properties without transgressing pre-defined limits for LDH content, density and volatility. By incorporating these methods into their distribution facilities, diluent producers and distributors are able to deliver diluents that satisfy demanding specifications and operational requirements, while expanding the supply of available diluents.

Thus in a first principal embodiment the invention provides a method for the controlled production and distribution of LDH enriched diluents so as not to violate pre-defined limits selected from LDH content, volatility, density, and combinations thereof comprising:

a) providing a diluent stream having a flow rate, a line pressure, a LDH content, a volatility and a density;
b) providing a variable rate LDH injection unit in fluid connection with said diluent stream;
c) optionally providing a petroleum/diluent blending unit in fluid connection with said diluent stream;
d) obtaining values for one or more parameters of said diluent stream selected from LDH content, volatility, density, and combinations thereof;
e) calculating a target rate of injecting LDH into said diluent stream based upon the one or more parameter values in step (d) so as not to violate the foregoing pre-defined limits;
f) injecting LDH into the diluent stream from the LDH injection unit at a pressure greater than said diluent stream pressure, and an actual injection rate in step (f) based upon the most recent calculation from step (e); and
g) periodically repeating steps (d) and (e) and adjusting the injection rate in step (f) based upon the most recent calculation from step (e).

In an additional principal embodiment the invention provides a method for the controlled production and distribution of a LDH enriched diluent stream so as not to violate pre-defined limits for LDH content, volatility and density, comprising:

a) providing a diluent stream having a flow rate, pressure, LDH content, volatility and density;
b) providing a variable rate LDH injection unit in fluid connection with said diluent stream;
c) optionally providing a diluent/petroleum mixing unit in fluid connection with said diluent stream;
d) obtaining parameter values for the LDH content and volatility upstream of said injection unit;
e) obtaining parameter values for the density and flow rate of said diluent stream downstream of said injection unit;
f) calculating a target rate of injecting LDH into said diluent stream based upon the parameter values for flow rate, LDH content, volatility and density, in steps (d) and (e), so as not to violate the foregoing pre-defined limits for LDH content, volatility and density;
g) injecting LDH into the diluent stream from the LDH injection unit at a pressure greater than said diluent stream pressure, and an actual injection rate less than or equal to the target rate calculated in step (f); and
h) periodically repeating steps (d), (e) and (f), and adjusting the injection rate in step (g) based upon the most recent calculation from step (f).

In a further principal embodiment the invention provides a method for the controlled production and distribution of a LDH enriched diluent stream so as not to violate pre-defined limits for LDH content, comprising:

a) providing a diluent stream having a flow rate, pressure, LDH content, volatility and density;
b) providing a variable rate LDH injection unit in fluid connection with said diluent stream;
c) optionally providing a diluent/petroleum mixing unit in fluid connection with said LDH injection unit and said diluent stream;
d) obtaining parameter values for the LDH content and flow rate upstream of said diluent stream;
e) calculating a target rate of injecting LDH into said diluent stream based upon the flow rate and LDH content obtained in step (d), so as not to violate the foregoing pre-defined limits for LDH content;
f) injecting LDH into the diluent stream from the LDH injection unit at an actual injection rate less than or equal to said target rate calculated in step (e); and
g) periodically repeating steps (d) and (e) and adjusting the injection rate in step (f) based upon the most recent calculation from step (e).

By integrating these methods into their distribution networks suppliers can increase the average flow rates of their hydrocarbon products, reduce the necessary line pressures for delivery, and reduce the overall per-barrel cost of petroleum fuel substances, while remaining in compliance with regulatory standards. In addition, line operators benefit because the hydrocarbon fluid composition improvements reduces the pressures necessary to transport products in lines, reduces both the fluid friction and the pressure-induced stress that cause wear and tear on the pipeline materials, and increases the average volume of hydrocarbon product they can service per hour per foot of pipeline in the network.

Additional advantages of the invention are set forth in part in the description that follows, and in part will be obvious from the description or may be learned by practice of the invention. The advantages of the invention will be realized and attained by means of the elements and combinations particularly pointed out in the appended claims. It is to be understood that both the foregoing general description and the following detailed description are illustrative and explanatory only and are not restrictive of the invention, as claimed.

DESCRIPTION OF THE DRAWINGS

FIG. 1 is a caricature of an illustrative embodiment of the invention showing relationships between functions.

FIG. 2 is a flow chart for an illustrative embodiment of the invention showing the relationships between analysis, fluid flow and blending.

FIG. 3 is a flow chart for an illustrative embodiment showing relationships between data acquisition, algorithms and injection controls.

FIG. 4 is a functional block diagram schematic for an illustrative embodiment.

DESCRIPTION OF THE INVENTION

Definitions and Use of Terms

Throughout the patent application, wherever an analysis of petroleum or LDH is disclosed, the analysis can be performed in accordance with applicable EPA regulations and American Society for Testing and Materials ("ASTM") methods in force as of the date of this application. The invention may be clarified and better understood by the following definitions.

"Attribute" means a characteristic, and includes physical characteristics, fluid flow characteristics, and other traits of fluids in engineered environments.

"Butane" has its usual meaning in fuel contexts; it refers to composition consisting substantially of $C_4H_{10}$ hydrocarbons, and as used herein may refer to either n-butane or iso-butane where the isomer is not specified, and includes commercially available butane in the presence of like-fraction hydrocarbons.

"Calculation" means the use of a mathematical algorithm to determine a value, and may be by a programmed software, a hardwired algorithm, or mental means.

"Condensate" means natural gas liquids (usually $C_5$-$C_{12}$ hydrocarbons) obtained from the extraction and/or production of natural gas.

"Controlled distribution of LDH enriched diluents" means distribution of diluent blends with one or more low density hydrocarbons, in which the enriched form of the diluent is blended with another hydrocarbon fluid in specific proportions with substantial accuracy to achieve pre-defined objectives for the physical properties of the final blend.

"Controlled production of LDH enriched diluents" means production of diluent blends with one or more low density hydrocarbons in specific proportions with substantial accuracy to achieve pre-defined objectives for the physical properties of the blend.

"Density" means the density of a substance as a function of mass per unit volume. The density can be reported directly, in terms of mass per unit volume, or indirectly using measures such as specific gravity.

"Diluent" means hydrocarbon added to crude, heavy naphtha, bitumen or other dense petrochemical material to reduce the viscosity or density of such material. A common source of diluent is natural gas condensate obtained during the extraction of natural gas. Other diluent sources include but are not limited to: light conventional produced hydrocarbon oils, refinery naphtha (i.e. straight run hydrocarbons from the refinery process, especially light naphtha) and synthetic crude oils. "Diluent" refers to hydrocarbons derived from a single source as well as pooled diluent streams. A diluent, by definition, preferably contains substantially virgin (uncracked) hydrocarbons, although trace amounts of cracked hydrocarbons (<5, 2 or 1%) are acceptable.

"Diluent/petroleum mixing unit" refers to a device, module or zone for enhancing the mixing of diluent and a heavy petroleum product such as bitumen or heavy crude. The blending may be active, as by stirring rods, rotating blades, magnetic stir bars, vibration or shaking. Additionally or alternatively the blending may be passive, as by diffusion or by passage through a turbulence-inducing chamber with ribbed sides.

"Diluent stream" means a stream of diluent that is flowing through a pipeline or other conduit.

"Flow rate" means the volume of a fluid that flows past a given point over a given period of time.

"Fluid communication" refers to the linkage of a pipeline to a source of a fluid. Optionally the linkage may be through a channel that can be closed or whose flow may be modulated. The linkage may be by any of the following: a door or window on the side of the pipeline; a branching pipe in the pipeline; an injection-facilitating fixture in a joint of the pipeline; a smaller secondary pipe that extends into the interior of the pipeline; or any other means that permits a fluid to flow into the pipeline. Optionally the flow may be constant, variable, or intermittent. In certain preferred embodiments of the invention the fluid flow into the pipeline by means of this linkage is capable of being modulated or stopped.

"Information processing unit" and "IPU" means a computational unit that is useful for at least one of accessing, receiving, processing, distributing and storing data. The IPU may receive data either passively or by affirmatively soliciting or searching for data on a separate information system. When an IPU is modified by the term "an," it will be understood that the invention contemplates that one or more IPU's may perform the function described for the IPU.

"Informational database" and "IDB" means an organized collection of information. As used herein the term includes spreadsheets, look-up tables, and dedicated database applications, and includes both electronic and hard copy databases. When an IDB is modified by the term "an," it will be understood that the invention contemplates that one or more IDB's may perform the function described for the IDB.

"Injection" and "injecting" as used with respect to a pipeline means insertion of a fluid into a pipeline. "Actual injection rate" means the actual—as opposed to predicted—flow rate of the fluid into the pipeline during an injection.

"Injection unit" refers to a device or module for injecting a substance into a pipeline. In certain preferred embodiments of the invention the substance to be injected is butane or LDH into a diluent pipeline. The substance may be injected at a fixed or variable pressure.

"Low density hydrocarbon" or "LDH" refers to hydrocarbons having a density equal to or lesser than the density of n-pentane or n-butane at 25° C. and one atmosphere of pressure. When the term LDH is used, it will be understood to refer to any single LD hydrocarbon or combination of LD hydrocarbons. Thus, where LDH content is measured or LDH is injected in accordance with this invention, it will be understood that any single LDH such as butane or propane (preferably butane) can be measured or injected, as well as any combination of LD hydrocarbons. Conversely, when a single LD hydrocarbon is specified in this document such as butane, it will be understood that the method can be practiced based on any other LDH or combination of LDH.

"LDH content" means LDH measured as a percentage of total hydrocarbon volume, preferably rounded to the nearest 0.1%.

"Line pressure" means pressure within a pipeline. These are described in a variety of ways. The Department of Energy has reported baseline values for a 6-inch diameter, schedule 80 metal buried pipeline at 11.1-12.1° C. at 0.8459 $g/cm^3$ density of field-produced API oil: viscosity (81.6 centipoise); Reynolds no. (~1205); friction (0.053 cm/s); velocity (~82); flow rate (205 gal/min; $dyne/cm^2$ (1,379, 000); and pressure drop (24.8 psi/mile).

"Obtaining" data or other information means acquiring such information. In some preferred embodiments information is obtained by making physical measurements, In other preferred embodiments information is obtained by receiving measurement data from a separate source. In still other preferred embodiments information is obtained from an in-house look-up table or databank. The term obtaining is to be understood in its broadest sense. The information obtained should also be understood in a broad sense, and may include values for physical parameters, regulatory guidelines, correlation tables for fuel properties, availability of diluent or butane, and other types of information.

"Parameter value" means the value of a physical property, and as used herein particularly includes values for fuels with respect to their low density hydrocarbon content, volatility and density. The term parameter value as used herein includes measured values, predicted values and desired values.

"Pooled supply" means a reservoir or otherwise collected reserve of a fluid intended for use in mixing. The term includes pooled supplies for any of the following: diluents, hydrocarbons, gasoline, and other fuel components.

"Pre-defined limit" means a predetermined boundary value for a parameter, where the source of the boundary value is a regulation, a company's policy, or an operator's professional judgment. The term "pre-defined limit" is used herein particularly with respect to low density hydrocarbon content in fuels, fuel volatility, fuel density, and combinations thereof.

"Reid vapor pressure (RVP)" means the absolute vapor pressure exerted by a liquid at 100° F. (37.8° C.) as determined by the test method ASTM-D-5191.

"Tank farm" means any facility that contains a number of large storage tanks for petroleum products, typically including loading racks from which tanker trucks are filled. The tanks may contain one or more types and grades of gasoline, including reformulated gasoline, and may also contain in pure form or in composite fluids, butane, diluents or other petroleum products.

"Target rate" means a desired rate of fluid flow.

"Variable rate" means a rate of fluid flow that is intended to be alterable at will or in other specific ways.

"Volatility" means the relative tendency of a liquid to vaporize, and can be measured by any suitable physical property, including vapor pressure or distillation temperature.

DISCUSSION

The inventors have developed means and methods for incorporating low-density hydrocarbons (LDHs) into diluent streams for heavy petroleum products. NGC diluent compositions vary but typically comprise hydrocarbons in a molecular weight range of from about five to about twelve carbons; professionals in the field have not employed lighter hydrocarbons as diluents. In fact various regulations and pipeline policies typically impose upper limits on LDH content and volatility and lower limits on diluent density, which would suggest that LDH content was already present in diluents as provided but is in fact deleterious and should be minimized. The inventors have discovered that introducing butane (i.e., $C_4$) into diluents at discrete levels provides several advantages and can be accomplished without exceeding pre-defined limits. In an illustrative range 5.0 to 7.0% LDH in a diluent imparts preferred properties.

LDH is typically absent from currently used diluents or is present at lower levels. Naphtha contains little LDH, whether it is derived from a natural or synthetic source. Synthetic crude has a heavier average molecular weight and represents a relatively narrow fraction of product from petroleum distillation, so it also has little if any LDH. Natural gas condensate has little LDH because it is removed at the source. NGC preparation also typically leaves little LDH, regardless of which of the many equipment configurations is used to prepare it. Thus natural gas is separated from the condensation hydrocarbons that are collected in the stream at the stream at the well; at the raw natural gas processing plant the condensate is first dehydrated and purified from acid gases, then typically ethane, propane, LDHs, pentanes and higher molecular weight hydrocarbon fractions (so-called $C5_+$) are removed and recovered as byproducts. Consequently relatively little if any LDH remains in the NGC output.

The instant invention introduces LDH into diluent streams and teaches means and methods for doing so. The compositions of NGC and other diluents vary even for synthetic product, and are also a function of the ambient pressure and temperature in the pipeline. Thus the present invention also provides methods for optimizing the LDH content to remain in compliance with each of the pre-defined limits for the diluent's physical properties.

Particular advantages are conveyed to commonly used diluents by the incorporation of LDH according to the invention prior to their blending with heavy grades of petroleum products. Among those advantages are: lower viscosity; lower density (i.e., less goes further); faster penetration as a solvent; ability to solubilize a wider range of compositions; lower freezing temperature; higher consistency from lot to lot; higher purity from lot to lot; lower chemical reactivity than naphtha; more facile recovery from the heavy petroleum blend during refining; and lower cost by mass or volume. However the invention is not limited to use for any of these purposes.

In order to maximize or otherwise optimize the LDH content without transgressing dictated boundary levels for the physical properties at issues, those properties are monitored. The monitoring can occur before the injection of LDH, in which case the optimal level is calculated based on algorithms. Or the monitoring can occur after the injection of LDH, in which case the optimal level of LDH flow or content can be adjusted in responses to changes in the composition of a diluent stream over the course of its flow. Or the monitoring can occur simultaneously at injection, in which case LDH content can be adjusted retroactively thereby exploiting mixing effects to smooth out differences in the LDH content at the injection point from moment to moment. The monitoring of physical parameters need not occur at the same place, same time, or same frequency.

The invention suggests a number of embodiments, each of which is described in greater detail below. Unless otherwise specified, each of the following embodiments can be implemented at any point along a diluent pipeline—i.e. at the source of a diluent stream, immediately before a diluent stream is pooled with other diluent streams, immediately after multiple diluent streams are pooled, or immediately before a diluent stream is added to a heavy petrochemical pool or stream.

Numerous methods exist for calculating the ratio of LDH that can be blended with a mixture of a given volatility to achieve a pre-defined volatility parameter, and these methods can be readily adapted to LDH injection processes. U.S. Pat. Nos. 7,032,629 and 6,679,302, PCT Patent Application No. WO/2007/124058, and U.S. Pat. App. No. 2006/0278304, the contents of which are hereby incorporated by reference, describe such methods of calculation. The blend ratio of butane to gasoline required to attain the fixed volatility can be determined simply by direct volumetric averaging of the volatility of the butane and ethanol-blended gasoline. However, it has been noted in the literature that volumetric averaging can yield low estimates of resultant volatility, especially when the amount of butane added is less than 25%. Methods for determining blend ratios to attain a prescribed volatility which overcome these observed limitations on volumetric averaging are set forth more fully in "How to Estimate Reid Vapor Pressure (RVP) of Blends," J. Vazquez-Esparragoza, *Hydrocarbon Processing*, August 1992; and W. E. Stewart, "Predict RVP of Blends Accurately," *Petroleum Refiner*, June 1959; and N. B. Haskell et al., *Industrial and Engineering Chemistry*, February 1942; and M. R. Riazi et al., "Prediction of the Reid Vapor Pressure of Petroleum Fuels," *Fuel Chemistry Division Preprints* (Amer. Chem. Soc.), 48(1):478 (2003); the disclosure from each being hereby incorporated by reference as if fully set forth herein. It should be noted that the system of the present invention can be modified to sample periodically the resultant blend's volatility for quality control when that is of concern.

In one particular embodiment, the diluent stream represents one batch of petroleum on a petroleum pipeline. The physical passage of batches will preferably be monitored based upon batch codes that indicate the type of petroleum product in the batch, and tracking software that monitors the progress and receipt of batches at a particular monitoring location. In this embodiment the blending operation further comprises an information processing unit which obtains the batch code of an arriving batch, compares the batch codes to a diluent batch code stored in an informational database and, when the batch codes match, enables the system to initiate LDH blending.

Near Infra-Red (NIR) Spectroscopy

NIR spectroscopy is an everyday tool used by the oil and gas industry. NIR does not require any specific sample preparation, requires short acquisition time, and allows performing an online measurement in a non-intrusive way. This is critical for the oil and gas industry since the product, as crude oil or refined fuel, remains almost its entire lifetime in pipelines.

To perform an NIR online measurement there are two possibilities. Either an immersion probe or a flow cell is used. Immersion probes are most widely used for Fourier transform near infrared (FT-NIR) measurements in process control and can work in a transmission mode or a reflection depending on the transmittance of the sample. For crude oil, reflectance will be typically used, while, for refined fuels, transmission can be the most appropriate. Besides immersion probes, flow cells are widely used. In this case, the sample flows directly through the cell where the spectrum is measured and measurement is done exclusively in transmission mode. Typically, a flow cell probe allows one to acquire the spectra of a fluid flowing in a pipeline at a high pressure, while the immersion probe is designed to measure at pressures close to atmospheric.

A large number of properties are measured with NIR spectroscopy these days at refineries with the final goal of ensuring quality or optimizing the production process. Those properties include, without limitation, RON (research octane number), MON (motor octane number), cetane index, % aromatics, % olefins, % benzene and % oxygenates, to RVP (Reid vapor pressure), D10%, D50%, D90%, Pour Point, Cloud Point, and Cold Filter Plugging Point or E170. Suitable NIR analyzers are the OMA 300 by Applied Analytical, having a spectral range of 400-1100 nm, ANALECT® PCM™ Series by Applied Instrument Technologies, having a spectral range of 833-8333 nm, the HP260X by ABB, having a spectral range of 714-2630 nm, the XDS Process Analytics™ by FOSS NIR Systems Inc., having a spectral range of 800-2200 nm, and the PetroScan™ by Light Technology Industries, Inc., having a spectral range of 1200-2400 nm.

Chemometrics

"Chemometrics" is a term applied to the generic discipline containing computers and mathematics to derive meaningful chemical information from samples of varying complexity (Workman, J. J., Jr (2008) NIR spectroscopy calibration basic. In: Burns, D. A. and Ciurczak, E. W. (eds), Handbook of Near-Infrared Analysis, 3rd edn. CRC Press, Boca Raton, FL). In chemometrics, a computer is tasked with interpreting NIR spectra from a plurality of samples using a variety of multivariate mathematical techniques. These techniques are used to produce a mathematical calibration model.

In routine NIR analysis, the spectra should be pretreated to enhance informative signals of the interested components and reduce uninformative signals as much as possible (Pantoja P A et al., Application of Near-Infrared Spectroscopy to the Characterization of Petroleum, in Analytical Characterization Methods for Crude Oil and Related Products, First Edition. Edited by Ashutosh K. Shukla. Published 2018 by John Wiley & Sons Ltd.). Smoothing, multiplicative scatter correction, mean centering, and Savitzky—Golay derivation are commonly applied to pretreat the spectra before modeling in order to remove the scattering effect created by diffuse reflectance and to decrease baseline shift, overlapping peak, and other detrimental effects on the signal-to-noise ratio (Boysworth, M. K. and Booksh, K. S. (2008) Aspects of multivariate calibration applied to near-infrared spectroscopy. In: Burns, D. A. and Ciurczak, E. W. (eds), Handbook of Near-Infrared Analysis, 3rd edn. CRC Press, Boca Raton, FL.).

NIR spectra are ultimately calibrated to relate the observed spectra, in a predictive manner, to a property of interest. With calibration it is possible to predict relevant physicochemical properties of an unknown hydrocarbon that compare accurately with reference information on these properties. In the process of this invention, the reference information is generated from pipeline samples taken simultaneously with spectral information on the pipeline to generate a chemometric dataset. The main calibration methods, as described by Lopez-Gejo et al., 2008, include principal component analysis (PCA), partial least squares (PLS) regression, and artificial neural networks (ANNs) (Lopez-Gejo, J., Pantoja, P. A., Falla, F. S., et al. (2008) Electronical and vibrational spectroscopy. In: Petroleum Science Research Progress, Publisher, Inc., 187-233).

Thus, in other methods and systems of the present invention, one or more physical property values are obtained by generating a spectral response of said diluent stream using absorption spectroscopy with a near infrared analyzer, and comparing said spectral response to a chemometric dataset specific for said physical property value in said diluent stream.

In still further methods and systems of the present invention, the chemometric dataset is built by taking two or more samples of said diluent stream from a pipeline; measuring said physical property of the samples offline; simultaneously with taking the two or more samples, obtaining a spectral response of the diluent in the pipeline using absorption spectroscopy with a near infrared analyzer; and correlating the spectral response with the measured physical property of the samples.

Example 1: Predicting Physical Properties of the Mixed Diluent/LDH Stream

LDH Content

As noted above LDH content refers to hydrocarbons, usually $C_{1-5}$ such as n-pentane or n-butane and lighter density hydrocarbons measured as a percentage of total hydrocarbon volume, preferably rounded to the nearest 0.1%. An illustrative typical range for a pre-defined limit for LDH content in a diluent stream is 5.0% or 7.0% but the invention is not so limited. The volume v/v % may be determined by prior addition or by separation of fractions during distillation. Conventional gas chromatographs are suitable for the determination of LDH content and fractions.

The following relationship can be used to adjust the LDH content, where $\chi_{limit}$ is the pre-defined upper limit for the w/w mass percentage of LDH in the blend or is the target w/w mass percentage, $\chi_{inherent\ m/m}$ is the w/w mass percentage of LDH present in the diluent before addition of butane, $d_{diluent}$ is the density of the diluent at the system temperature, and $d_{butane}$ is the density of butane at the system temperature.

$$\text{v/v \% butane in diluent} = [(\chi_{limit} - \chi_{inherent\ LDH\ m/m}) \times (d_{diluent}/d_{butane})] \times 1\%$$

Volatility

The volatility is preferably measured as a vapor pressure, a vapor liquid ratio, a distillation temperature requirement, or combinations thereof. The vapor pressure requirement can comprise a maximum allowable vapor pressure, a minimum allowable vapor pressure, a maximum allowable vapor liquid ratio, a minimum allowable vapor liquid ratio, or a minimum allowable distillation temperature. In particular embodiments, the minimum allowable distillation temperature can comprise a minimum T(50), a minimum T(10), or both a minimum T(50) and a minimum T(10), where T(xx) refers to the ASTM distillation temperature for the point at which xx volume percent has been distilled.

When vapor pressure is measured according to the present invention, it will be understood that any suitable measure of vapor pressure could be taken, including Reid vapor pressure and/or vapor/liquid ratio and/or distillation temperature. For measuring the Reid vapor pressure ASTM standard method D5191 can be used. A particularly suitable pre-defined limit for vapor pressure in a diluent stream is 14.94 psi, when measured according to method D5191.

In a particular embodiment, the volatility measurement comprises a vapor pressure measurement and a distillation temperature measurement, and the volatility requirement comprises a maximum allowable vapor pressure and a minimum allowable distillation temperature. The ratio of butane can then be calculated so that the final blend meets both the maximum allowable vapor pressure and the minimum allowable distillation temperature.

In a particular embodiment, the volatility can be measured by an analyzing unit that includes an analyzer such as a Grabner unit or a Bartec Distillation Process Analyzer (DPA). For example, the analyzing unit can include a Grabner unit for obtaining vapor pressure and vapor liquid ratio measurements, and a Bartec unit for obtaining distillation temperature measurements. In particular embodiments, a Grabner unit can be used to obtain volatility measurements on a periodic basis of about 3 to about 5 times per hour, and a Bartec unit can be used to obtain volatility measurements on a periodic basis of about 2 times per hour.

The following relationship can be used to adjust volatility, where $p_{butane}$ is the vapor pressure of pure butane at the system temperature, and $p_{limit}$ is the pre-defined upper limit for the vapor pressure of the blend or is the target vapor pressure, and where $p_{diluent}$ is the vapor pressure of the diluent at the system temperature.

$$\text{v/v \% butane in diluent} = [(p_{butane} - p_{limit})/(p_{butane} - p_{diluent})] \times 100\%$$

Density

A preferred method of measuring the density of a diluent stream is reported as ASTM standard method 4052, conducted at 15° C., using a suitable commercially available density measuring device. A suitable range of density for the diluent stream in this application, when measured according to the foregoing method, is from 600 to 799 kg/m³. Alternatively or in addition, density can be measured in terms of specific gravity or its corollary, API gravity, where the specific gravity of butane is 0.584, and the API gravity of butane is 110.8 API gravity and specific gravity are related according to the following formulae:

API Gravity at 60° F.=(141.5/SG)−131.5

Specific Gravity at 60° F.=141.5/(API Gravity+ 131.5)

Preferred limits on API gravity for the diluent stream, when measured according to ASTM D4052 at 60° F., are from 46 to 86.

The measurement of density according to this invention gives rise to several distinct embodiments. In one embodiment, the density of the diluent stream is continually measured, and the LDH is injected into the diluent stream at a calculated rate so as not to violate pre-defined limits for density. The density can be the sole measure used to control the LDH injection rate, or it can be combined with pre-defined limits for other measures, such as volatility and LDH content, to determine the rate of LDH injection into the diluent stream.

In another embodiment, the density is measured but not used to control the injection rate of LDH. In this embodiment, LDH will be injected so as not to violate pre-defined limits for LDH content and volatility, and the density of the diluent stream downstream of the injection point will be measured and recorded in an informational database.

The following relationship can be used to adjust the density of diluent with butane, where $d_{diluent}$ is the density of the diluent at the system temperature, $d_{butane}$ is the density of butane at the system temperature, and $d_{limit}$ is the pre-defined lower limit for the density of the blend or is the target density.

$$\text{v/v \% butane in diluent} = [(d_{diluent} - d_{limit})/(d_{diluent} - d_{butane})] \times 100\%$$

Parameters in Balance

When LDH, density and volatility are used in balance, the optimal compliant v/v % is selected as the lowest one of the three values that are calculated by the respective v/v % equations in the three sections immediately preceding this one.

Note that when the values of the parameter are obtained, they need not be obtained simultaneously, nor must they necessarily be re-obtained with every repetition of the process. Moreover, values for any blending parameter can be obtained either upstream or downstream of the LDH injection unit.

Example 2: Layout of Process Components

The relative locations of the sampling, measuring and injection steps and systems is a matter of practical convenience. In a particular embodiment they are located in close proximity to one another. For example, the sampling, measuring and injection systems can be housed on a discreet, permanently mounted skid or platform.

Alternatively the sampling, measuring and injection steps and systems are located in different locations. For example, the sampling and measuring steps can occur at any location upstream of the injection. Furthermore, the injection step can occur either at a single location or at multiple locations.

Example 3: Butane Sampling Units

Additionally, the systems of the foregoing embodiments may further comprise a butane sampling unit for periodically or continuously withdrawing butane from said butane stream, and validating the butane for sulfur content and other relevant properties. Said butane sampling units may be under the control of one or more information processing units, wherein said one or more information processing unit may cause said butane sampling unit to withdraw into a reservoir at least one sample of butane from said butane stream at least every 500,000 gallons of butane. Said reservoir may be manually withdrawn periodically from said butane sampling unit, and any butane contained in said reservoir may be tested for sulfur content.

Example 4: Butane Storage and Monitors for Pressure and Temperature

The systems of the foregoing embodiments may further comprise: (a) a butane storage unit; (b) underground piping for transmitting said butane stream from said butane storage unit to said butane injection unit; (c) a first butane pressure sensor in sensory communication with said butane stream at or near said butane storage unit; (d) a second butane pressure sensor in sensory communication with said butane stream at or near said butane injection unit; and (e) a remote information processing unit (IPU) in informational communication with said first and second butane pressure sensors, for remotely monitoring and displaying butane pressures detected by said first and second butane pressure sensors.

Also, the foregoing embodiments may further comprise: (a) a butane storage unit; (b) a temperature gauge for measuring the temperature of butane in said butane storage unit; and (c) a remote information processing unit in informational communication with said temperature gauge, for remotely monitoring and displaying temperatures detected by said temperature gauge.

Example 5: Butane Injection by Two Valve System, and Autonomous Control

Significantly, the injection unit described in any of the foregoing embodiments may comprise two valves. One valve is an on/off valve located between the diluent stream and the butane stream. This valve can prevent diluent from entering the butane injection unit. The second valve is a modulating valve that controls the flow of butane towards the first valve. The second valve controls the rate of flow of butane by modulating both the pressure of the butane stream passing through the valve as well as the size of the orifice through which the butane stream flows. The modulating valve and/or the on/off valve may be under the control of a process control unit, which varies the blend ratio to attain a desired vapor pressure, based on the vapor pressure of diluent entering the butane injection unit, the vapor pressure of butane entering the butane injection unit, and the desired vapor pressure of the blended diluent. A butane addition rate may then be calculated based upon the blend ratio and the rate of flow in the diluent stream, and the modulating valve may be opened or closed to allow butane addition at the rate thus calculated. The valves may also be under the control of one or more remote information processing units.

Example 6: Databases and Information Processing Unit

Additionally, any of the foregoing embodiments may comprise one or more informational databases and an information processing unit (IPU). In operation, the IPU retrieves allowable blending parameters (i.e. volatility, LDH and/or density limits) from the informational database and, based on the physical properties of the diluent stream, calculates the blend ratio and/or blend rate based upon the relevant blending parameters. As used throughout the present application, the term "retrieve" includes both retrieving data and receiving data from another source.

The IPU may also process various results of the blending operation and store the results on the informational database. For example, the IPU can transmit to the database for recording the upstream physical properties of the diluent stream, the downstream physical properties of the diluent stream, or the physical properties of the butane stream, and can associate such properties with discreet time points or segments. Such physical properties include, for example, density, volatility, LDH content, temperature and flow rate. In one particular embodiment, the temperature of the LDH is used to normalize the volume of the LDH to the volume of the diluent stream, and to calculate the volume of diluent created by the injection operation.

In other embodiments the IPU receives or retrieves data from an IPU under the control of a different entity. Thus, for example, the pipeline operator may periodically measure the flow rate, density or temperature of diluent flowing through the pipeline, and transmit (or make accessible) such information to the operator of the butane injection unit for use in the IPU.

Example 7: Adjustability of Blend Rates

The diluent stream of the foregoing embodiments may have a diluent flow rate that does not vary over time, and therefore, the blend rate can be calculated based upon a pre-set diluent flow rate. Alternatively, the diluent stream may have a diluent flow rate that varies over time, and therefore, utilization of the invention will further comprise periodically determining the diluent flow rate through the pipeline, and periodically recalculating the LDH blend rate based upon the diluent flow rate and a calculated blend ratio. Specifically, the systems of the present invention may further comprise one or more IPUs in informational communication with upstream vapor pressure sensors, logically programmed to calculate a blend ratio and blend rate based upon the vapor pressure and volumetric flow rate of said diluent stream, and for communicating said calculated blend ratio and calculated blend rate to said butane injection unit; wherein said butane injection unit periodically receives said calculated blend ratio and calculated blend rate from said one or more IPUs, and adjusts the actual blend ratio and actual blend rate to coincide with said calculated blend ratio and calculated blend rate.

Example 8: Remote and Local Control

Any of the foregoing data, including the fixed volatility requirements, volatility measurements, and ratio of butanes can be stored in a database accessible to a remote location through a dedicated or Internet connection. Furthermore, any of the data or signals encoding the data can be transmitted via dedicated or internet connections between the components of the system.

The foregoing embodiments of the invention may further include a manual switch to shut down the system. The manual switch may operate to turn off an on/off valve that may be located between the diluent and butane streams. The embodiments of the invention may also include an IDB for storing data accessible to an IPU with access to an internet connection.

Example 9: Placement Relative to Pipeline and Storage Facility

The butane injection units described in the foregoing embodiments of the invention may be placed on a skid or platform. The invention may be located anywhere downstream of a diluent source. The invention may also be located at a diluent tank farm, either before the diluent stream is introduced to a tank, or after the diluent stream is withdrawn from the tank. The tank farm may be a terminal diluent tank farm, an intermediate diluent tank farm, or a combined use tank farm.

Example 10: Illustrative Drawings

FIG. 1 shows one illustrative embodiment of the invention. There an information processing unit (IPU, 110) retrieves data concerning pipeline diluent LDH content and pipeline diluent volatility from a first measurement unit (130) through a first communication line, and compares those values to standards and instructions received through a second communication line from an informational database (IDB, 120). The IPU also retrieves data about pipeline diluent density and pipeline diluent flow rate from a second measurement unit (150) through a third communication line and compares those values to standards and instructions from the IDB. Then based on a programmed algorithm the IPU sends instructions through a fourth communication line to inject butane from a pooled butane source (140) at an optimized controlled rate by means of a variable rate pump (160) into the diluent pipeline (170) where it is mixed with the diluent in a mixing zone (180) and transported in mixed form in the direction of fluid flow (190) for the pipeline. Here the combination of the pooled butane source and variable rate pump serves as a variable rate butane injection unit. The mixing zone optionally includes stationary threads on the pipe's interior and or moving blades so as to enhance the injection action in the vicinity of the injected butane. One or more portions of the measurement units optionally extend into the interior of the pipeline to collect data on the characteristics of the fluid and its flow.

FIG. 2 illustrates another embodiment of the invention. There a diluent stream (210) is sampled by several analytical units both before (231, 232, and 233) and after (234, 235, 236) passing through a mixing zone (250) where it is injected with butane from a butane stream (240). The blended diluent/butane stream (260) is combined with petroleum from a petroleum stream (220) at a diluent/petroleum blending unit (270) to provide a final stream with a petroleum blend (280). The invention is not limited by the number of analytical units or by whether the placement of a particular analytical unit is upstream as opposed to downstream of the diluent mixing zone or vice versa. Some of the respective analytical units may assess, instead of LDH content, volatility and density, a parameter such as flow rate, sulfur content, metals content, nitrogen content, organic oxygen atom content, metals content, air content, other elemental content, aromatic ring content, viscosity, specific heat, compressibility or other parameters.

FIG. 3 illustrates a further embodiment of the invention. Here the measured value for each of three diluent parameters is compared to its respective maximum allowable value. Then in each case the amount of butane is identified that would need to be added in order to reach the maximum allowable value for the respective parameter. The ceiling values are typically greater than (or no lower than equal to) the measured value of each parameter. Thus the permissible extent for adding butane is determined independently and separately as a function of LDH content (310), as a function of volatility (320) and as a function of density (330). A comparator and decision function (340) determines which of the three extents is smallest, and selects that basis to define the maximum amount or rate of butane that can be added at that time. The actual amount selected to be added may optionally be somewhat less to ensure a margin of certainty for compliance. Or the actual amount selected to be added may be somewhat more to compensate for time lags in adjusting low butane injection levels, since mixing effects will tend to smooth out peaks and valleys in injection over time. The diluent flow rate is assessed (350) in order to determine the amount of diluent that is being treated every second, minute, hour, day or other time increment. Then the diluent injection rate is adjusted so that the level selected at step 340 is adapted to the diluent rate determined at step 350. The maximum allowable ceiling values may be taken as a function of only the diluent identity, or alternatively as a function of the diluent and its temperature, or in another embodiment as a function of not only the diluent and its temperature but also as a function of a particular petroleum stream and its temperature.

The sequence shown in FIG. 3 represents modular tasks for and from which information is communicated. Such communications between each step may be manual, vocal, electronic through a transmission line, wireless, some other communication mode, or a variance or combination thereof.

FIG. 4 illustrates a functional block diagram of the architecture and components of an exemplary embodiment of an analysis and injection system for butane, a diluent and optionally an additional additive. The butane supply (400) comprises a butane tank (405), a butane inlet line (410), a pump back line (415) and an outlet line (420). The butane tank (405) is filled with butane through the inlet line (410). The butane supply (400) may further comprise one or more pressure safety valves (425), a level indicator (430), a temperature gauge (432), and a pressure gauge (434). The butane supply (400) may further comprise a bypass line (440) in fluid connection with the butane tank (405) and the outlet line (420). The bypass line (440) can be employed to maintain constant pressure in the outlet line (420).

Butane is supplied to an injection station (426) by the outlet line (420). Optionally a plurality of injector stations (426) may be operated in parallel and located on an injection skid.

Diluent is provided from a diluent source (450) which may be a diluent stream as in a long distance pipeline, or may be a tank, a wellhead, or another source. Diluent is provided from the source (450) through one or more diluent lines (452). In order to determine the amount of butane to add, samples of diluent are drawn from an upstream outlet line (460) and or a downstream outlet line (470), wherein the terms upstream and downstream are relative to the point of butane addition in the respective diluent line (452) by an injector station (426).

For the upstream outlet line (460) the diluent is directed to a sample selection station (462) generally with the aid of one or more pumps (464), and then transferred to a sample conditioning station (476). The downstream outlet line (470) is comparable: it directs diluent to a sample selection station (472) generally with the aid of one or more pumps (474), and then transfers it to a sample conditioning station (476). The sample conditioning station (476) may be the same for both the upstream and downstream sampling, e.g., it may receive samples in alternation fashion from the upstream and downstream sources. Or the upstream and downstream sample selection station may have a different conditioning station than the downstream conditioning station. FIG. 4 depicts an illustrative embodiment in which just one conditioning station (476) is employed, but the invention is not so limited.

From the sample conditioning station (476) the diluent may optionally be combined with another additive. Such an additive may be provided from an additive source (480), passed through an additive line (482) and then combined with conditioned sample at an injection skid (483), passed through a mixer (485) such as a static mixer. The conditioned sample, optionally mixed with another additive, is then flowed into an analyzer (486). The analyzer may include one or more instruments and test for LDH content, volatility, density, sulfur content, metals content, specific heat capacity, and or other types of tests. Optionally a plurality of analyzers is employed in series or in parallel, with each respective analyzer running a different type of test.

For the particular embodiment depicted in FIG. 4, after the analyzer (486) completes its measurements on a particular sample the sample may enter a sample retention station (487) where it may reside for some period in a sample retention tank (488) until being pumped out by a sample pump (489) to one or more diluent lines (452) through a return line (490). There are many conceivable permutations for post-analysis processing and return of sample to the diluent, and the invention is not limited to any of them.

Throughout this application, various publications are referenced. The disclosures of these publications are hereby incorporated by reference in order to more fully describe the state of the art to which this invention pertains. It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for the controlled production and distribution of butane enriched diluents so as not to violate pre-defined limits selected from butane content, volatility, density, and combinations thereof comprising:
a) providing a diluent stream having a flow rate, a line pressure, a butane content, a volatility and a density;
b) providing a variable rate butane injection unit in fluid connection with said diluent stream;
c) obtaining values for one or more parameters of said diluent stream selected from butane content, volatility, density, and combinations thereof;
d) adjusting a rate of injecting butane into said diluent stream based upon the one or more parameter values in step (c) so as not to violate the foregoing pre-defined limits; and
e) injecting butane into the diluent stream from the butane injection unit at a pressure greater than said diluent stream pressure, and the adjusted rate from step (d).

2. The method of claim 1, further comprising periodically repeating steps (c) and (d) and adjusting the injection rate in step (e) based upon the the adjusted rate from step (d).

3. The method of claim 1 wherein said pre-defined limits include butane content and volatility, and said parameter values obtained in step (c) include butane content and volatility.

4. The method of claim 1 wherein said pre-defined limits include density, and said parameter values obtained in step (c) include density.

5. The method of claim 1 wherein said pre-defined limits include butane content, volatility and density, and said parameter values obtained in step (c) include butane content, volatility and density.

6. The method of claim 1 wherein said diluent flow rate varies over time, the method further comprises obtaining said flow rate, and step (d) is performed based upon the flow rate obtained in step (c).

7. The method of claim 2 wherein:
i) said variable rate butane injection unit comprises a supply of butane at a butane pressure greater than said diluent stream pressure, and an on-off valve and regulating valve between said supply of butane and said diluent stream, and
ii) said rate adjustment step comprises modulating the orifice size in said regulating valve.

8. The method of claim 1 wherein in step (c):
i) said volatility is obtained by measuring the volatility of said diluent stream;
ii) said butane content is obtained by measuring the butane content of said diluent stream; and
iii) said density is obtained by receiving a density measurement from an external source.

9. The method of claim 1 wherein in step (c):
i) said volatility is obtained by measuring the volatility of said diluent stream using a manometer; and
ii) said butane content is obtained by measuring the butane content of said diluent stream using liquid chromatography.

10. The method of claim 1 further comprising:
a) providing an informational database on which are stored said pre-defined limits;
b) providing one or more information processing units logically programmed to:
i) receive said parameter values for volatility, butane content and density of said diluent stream;
ii) calculate said target butane injection rate based upon said flow rate, volatility, butane content and density of said diluent stream and said pre-defined limit stored in said information database; and
iii) control said actual butane injection rate so as to correlate with said target butane injection rate.

11. The method of claim 1, further comprising providing a pipeline comprising two or more sequential batches of differing petroleum products, wherein at least one of said batches comprises said diluent stream.

12. The method of claim 1 wherein the butane content of said diluent stream after said butane injection step (e) is between 5.0% and 7.0%.

13. The method of claim 1 wherein the diluent comprises natural gas condensate.

14. The method of claim 1 wherein the API gravity of said diluent stream after said butane injection step (e) is between 46 and 86.

15. The method of claim 1, wherein one or more of said values is obtained by generating a spectral response of said diluent stream using absorption spectroscopy with a near infrared analyzer, and comparing said spectral response to a chemometric dataset specific for said value in said diluent stream.

16. The method of claim 15, wherein said chemometric dataset is built by taking two or more samples of said diluent from a pipeline; measuring said physical property of the samples offline; simultaneously with taking the two or more samples, obtaining a spectral response of the diluent in the pipeline using absorption spectroscopy with a near infrared analyzer; and correlating the spectral response with the value of the samples.

17. The method of claim 1, further comprising blending said diluent with crude oil.

18. A method for the controlled production and distribution of a butane enriched diluent stream so as not to violate pre-defined limits for butane content, comprising:
- a) providing a diluent stream having a flow rate, pressure, butane content, volatility and density;
- b) providing a variable rate butane injection unit in fluid connection with said diluent stream;
- c) obtaining a parameter value for the butane content of the diluent stream upstream and/or downstream of said injection unit;
- d) adjusting a rate of injecting butane into said diluent stream based upon the parameter value for the butane content in step (c), so as not to violate the foregoing pre-defined limits for butane content; and
- e) injecting butane into the diluent stream from the butane injection unit at a pressure greater than said diluent stream pressure, and the adjusted rate from step (d).

19. The method of claim 18, further comprising periodically repeating steps (c) and (d) and adjusting the injection rate in step (e) based upon the most recent adjusted rate from step (d).

20. A method for the controlled production and distribution of a butane enriched diluent stream so as not to violate pre-defined limits for volatility, comprising:
- a) providing a diluent stream having a flow rate, pressure, butane content, volatility and density;
- b) providing a variable rate butane injection unit in fluid connection with said diluent stream;
- c) obtaining a parameter value for the volatility upstream and/or downstream of said injection unit;
- d) adjusting a rate of injecting butane into said diluent stream based upon the volatility obtained in step (c), so as not to violate the foregoing pre-defined limit for volatility;
- e) injecting butane into the diluent stream from the butane injection unit at the adjusted rate from step (d).

21. The method of claim 20, further comprising periodically repeating steps (c) and (d) and adjusting the injection rate in step (e) based upon the most recent adjusted rate from step (d).

22. The method of claim 1, wherein the diluent stream is at a diluent tank farm.

23. The method of claim 18, wherein the diluent stream is at a diluent tank farm.

24. The method of claim 20, wherein the diluent stream is at a diluent tank farm.

* * * * *